United States Patent
Shi et al.

(10) Patent No.: US 12,169,432 B2
(45) Date of Patent: Dec. 17, 2024

(54) DEVICE SUSPEND METHOD AND COMPUTING DEVICE

(71) Applicant: HUAWEI TECHNOLOGIES CO., LTD., Guangdong (CN)

(72) Inventors: Liang Shi, Shanghai (CN); Xiaolong Shen, Shenzhen (CN); Weilan Wang, Shanghai (CN); Junfeng Zhao, Shenzhen (CN); Fangmin Lu, Shenzhen (CN); Xin Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/955,695

(22) Filed: Sep. 29, 2022

(65) Prior Publication Data

US 2023/0023461 A1    Jan. 26, 2023

Related U.S. Application Data

(63) Continuation of application No. PCT/CN2021/083400, filed on Mar. 26, 2021.

(30) Foreign Application Priority Data

Mar. 31, 2020  (CN) .......................... 202010245862.6

(51) Int. Cl.
*G06F 1/00*     (2006.01)
*G06F 1/3296*   (2019.01)
*G06F 9/4401*   (2018.01)

(52) U.S. Cl.
CPC .......... *G06F 1/3296* (2013.01); *G06F 9/4418* (2013.01)

(58) Field of Classification Search
CPC ...... G06F 1/3296; G06F 9/4418; G06F 9/485; G06F 9/5022; G06F 9/5027; Y02D 10/00
See application file for complete search history.

(56) References Cited

U.S. PATENT DOCUMENTS 5,752,044 A      5/1998   Crump et al.
10,268,486 B1 *  4/2019   Mitra ................... G06F 1/3206
(Continued)

FOREIGN PATENT DOCUMENTS

CN    102779072 A    11/2012
CN    102841674 A    12/2012
(Continued)

OTHER PUBLICATIONS

Chen Peng et al., A kind of program's autorun method after wake from hibernation of embedded system, Application of Electronic Technique, 2012, vol. 38, Issue 2, 3 pages.
(Continued)

*Primary Examiner* — Xuxing Chen

(57) ABSTRACT

A device suspension method and a computing device are provided. In the method, before a device enters a suspended state, memory space occupied by a background process that is unrelated to a foreground process is released. In this way, the background process unrelated to the foreground process is not saved in a memory of the device. In other words, it reduces data stored in the memory when the device is suspended. Therefore, when the device needs to be woken up, only a relatively small amount of data needs to be read from the memory, and a working state can be rapidly restored. This can reduce a delay of reading data from the memory when the device is woken up, thereby accelerating a wakeup speed of the device. In addition, the data is stored in the memory when the device is suspended.

17 Claims, 7 Drawing Sheets

(56) References Cited

U.S. PATENT DOCUMENTS

| | | | |
|---|---|---|---|
| 2008/0313482 A1 | 12/2008 | Karlapalem et al. | |
| 2012/0221875 A1 | 8/2012 | Bak et al. | |
| 2014/0136773 A1* | 5/2014 | Michalak | G06F 3/0647 |
| | | | 711/105 |
| 2015/0205619 A1 | 7/2015 | Kato | |
| 2015/0293782 A1* | 10/2015 | Shida | G06F 9/485 |
| | | | 719/320 |
| 2015/0347181 A1 | 12/2015 | Myrick et al. | |
| 2018/0349261 A1 | 12/2018 | Desai et al. | |
| 2021/0311783 A1* | 10/2021 | Lee | G06F 9/46 |

FOREIGN PATENT DOCUMENTS

| | | |
|---|---|---|
| CN | 103365392 A | 10/2013 |
| CN | 103927145 A | 7/2014 |
| CN | 105573860 A | 5/2016 |
| CN | 105739982 A | 7/2016 |
| CN | 106528282 A | 3/2017 |
| CN | 107168798 A | 9/2017 |
| CN | 110865884 A | 3/2020 |
| EP | 0635788 A1 | 1/1995 |

OTHER PUBLICATIONS

Kazuomi Kato, Ultra-Fast Boot Approach Using Suspend to RAM on Linux based IVI System, Panasonic Automotive, Jun. 1, 2017, 36 pages.

International Search Report and Written Opinion issued in PCT/CN2021/083400, dated Jun. 30, 2021, 10 pages.

Extended European Search Report issued in EP21780288.3, dated Apr. 24, 2023, 12 pages.

* cited by examiner

DEVICE SUSPEND METHOD AND COMPUTING DEVICE

CROSS-REFERENCE TO RELATED APPLICATIONS

This application is a continuation of International Application No. PCT/CN2021/083400, filed on Mar. 26, 2021, which claims priority to Chinese Patent Application No. 202010245862.6, filed on Mar. 31, 2020. The disclosures of the aforementioned applications are hereby incorporated by reference in their entireties.

TECHNICAL FIELD

This application relates to the field of computer technologies, and in particular, to a device suspension method and a computing device.

BACKGROUND

The device power consumption issue has long been a challenge in the industry. One of the methods for addressing the power consumption issue is as follows: When a system of a device is idle, the device is suspended; and when the device needs to be used, the system is rapidly woken up, to restore a working state. This reduces power consumption when the device is not in use. In addition, the system is rapidly woken up when the device needs to be used, thereby reducing impact of the suspension on a user.

For example, a suspension method comprises suspending to random access memory (STR). A main idea of STR is as follows: When a system of a device is in an idle state, data corresponding to each task running in the system, data in a cache, data in a register of a central processing unit (CPU), and the like are written to a random access memory, and the CPU and some components are powered off, so that the device is in a low power consumption state. When the device needs to be used, corresponding data is read from the random access memory to unfreeze the tasks and restore the entire system. After suspending to random access memory is performed, all data is saved in the random access memory. Therefore, in the suspending to random access memory method, power needs to be supplied only to the random access memory and a remaining component that is not powered off, thereby reducing power consumption of the device when the system is idle.

However, when the device needs to be woken up, data needs to be read from the random access memory. A data reading process has a specific delay, resulting in a relatively slow wakeup speed of the system. Therefore, how to balance power consumption and a wakeup speed of a device is a technical problem that needs to be resolved urgently at present.

SUMMARY

This application provides a device suspension method and a computing device, which are used to accelerate a wakeup speed of a device while ensuring low power consumption of the device.

According to a first aspect, a device suspension method is provided. In the method, when a system of a device is in an idle state, first, a background process that is unrelated to a foreground process and that runs in the system is terminated, and memory space occupied by the background process is released. Then, running information of the system is stored in a memory of the device. The running information of the system does not include information about the released background process. Then, the device is controlled to enter a suspended state. In this embodiment, that the device is controlled to enter a suspended state includes: Other components in the device except the memory are powered off. The other components include a processor of the device.

In the foregoing technical solution, before the device enters the suspended state, the memory of the device does not store the background process that is unrelated to the foreground process. In other words, data stored in the memory when the device is suspended is reduced. Therefore, when the device needs to be woken up, only a relatively small amount of data needs to be read from the memory, and a working state can be rapidly restored. This can reduce a delay of reading data from the memory when the device is woken up, thereby accelerating a wakeup speed of the device. In addition, the data is stored in the memory when the device is suspended. Therefore, in the suspended state, power needs to be supplied only to the memory of the device, thereby ensuring low power consumption of the device.

In an example embodiment, before the device is controlled to enter the suspended state, data in a first part of memory units in the memory may be further compressed and then migrated to a second part of memory units in the memory. The memory of the device includes a plurality of memory units, occupied storage space in the first part of memory units is less than a threshold, and the second part of memory units includes a memory unit that stores data of an operating system and a memory unit whose occupied storage space is greater than or equal to the threshold. The threshold may be set based on actual use. In this case, that the device is controlled to enter a suspended state includes: Other components in the device except the second part of memory units are powered off.

In the foregoing technical solution, if the memory of the device includes a plurality of memory units, when the running information of the system is saved, the running information of the system, for example, data of each process in a running state, may be stored in the plurality of memory units in a distributed manner. In this case, data stored in the memory may be compressed and migrated to some memory units, for example, migrated to the second part of memory units. In this way, the running information of the system is stored only in the second part of memory units. This can reduce a quantity of memory units occupied by the running information of the system. In this way, when the device is controlled to enter the suspended state, power may be supplied only to the second part of memory units, without a need to supply power to the entire memory, thereby further reducing power consumption of the device in the suspended state.

Further, when the data stored in the memory is compressed and migrated, data stored in a specific memory unit may be selected, compressed, and migrated to another memory unit. The specific memory unit may be a memory unit whose occupied storage space is less than the threshold. This can reduce an amount of data for compression processing, and can reduce an amount of data that needs to be migrated.

Further, in the foregoing technical solution, the data in the first part of memory units whose occupied storage space is less than the threshold is migrated. In this way, a relatively small amount of data is migrated. When the device needs to be woken up, only the small amount of data needs to be migrated to an initial location, thereby reducing processing duration at a wakeup stage and increasing a wakeup speed.

In an example embodiment, before the device is controlled to enter the suspended state, memory space occupied by an inactive page in the memory may be further released.

In the foregoing technical solution, in the memory of the device, memory pages may be categorized into an active page and an inactive page based on a factor such as a data use frequency. For example, data in the active page may represent recently used data, and data in the inactive page may represent data that has not been used in a period of time. Therefore, memory space occupied by the running information of the system of the device can be further reduced by releasing the memory space occupied by the inactive page before the device enters the suspended state. In addition, the memory space occupied by the running information of the system is further reduced. Therefore, an amount of data stored in the memory is also reduced. This can further reduce an amount of data for compression processing and an amount of data that needs to be migrated. Further, the processing duration at the wakeup stage can be further reduced, thereby increasing a wakeup speed.

In an example embodiment, after the device is controlled to enter the suspended state, if the device needs to be woken up, power supply to the other components in the device may be restored, and the compressed data stored in the second part of memory units is decompressed and then migrated to the first part of memory units. In this way, the device may restore, based on data stored in the first part of memory units and the second part of memory units, a process that runs in the system before the device enters the suspended state.

In the foregoing technical solution, when the device needs to be woken up, the compressed and migrated data may undergo decompression processing and then be migrated back to an initial memory unit (that is, the first part of memory units), so that the processor reads the data from the corresponding memory unit to restore the process that runs in the system before the device enters the suspended state.

If the system needs to restore the terminated background process, the corresponding background process needs to be re-created. If the system needs to use data in the released inactive page, data may be read again from a storage location of the data as in a page missing case.

According to a second aspect, a device suspension method is provided. In the method, when a system of a device is in an idle state, first, running information of the system is saved to a memory of the device. Then, data in a first part of memory units in the memory is compressed and then migrated to a second part of memory units in the memory. The memory of the device includes a plurality of memory units. Occupied storage space in the first part of memory units is less than a threshold, and the second part of memory units includes a memory unit that stores data of an operating system and a memory unit whose occupied storage space is greater than or equal to the threshold. The threshold may be set based on an actual use case. Finally, the device is controlled to enter a suspended state. When the device enters the suspended state, other components in the device except the second part of memory units are powered off. The other components include a processor of the device.

In the foregoing technical solution, before the device is controlled to enter the suspended state, the running information of the system saved in the memory is compressed. This can reduce memory space occupied by the running information of the system. Further, compressed data is migrated to some memory units, for example, migrated to a second part of the memory that includes the memory unit that stores the data of the operating system and the memory unit whose occupied storage space is greater than or equal to the threshold. In this way, the running information of the system is stored only in the second part of memory units. This can reduce a quantity of memory units occupied by the running information of the system. In this way, when the device is controlled to enter the suspended state, power may be supplied only to the second part of memory units, without a need to supply power to the entire memory, thereby reducing power consumption of the device in the suspended state.

In an example embodiment, before the running information of the system is saved to the memory of the device, first, a background process that is unrelated to a foreground process and that runs in the system may be terminated, and memory space occupied by the background process may be released.

In the foregoing technical solution, the background process that is unrelated to the foreground process is terminated and released. This can reduce an amount of data saved in the memory when the device enters the suspended state, further reducing memory units to which power needs to be supplied in the suspended state. In addition, the amount of data stored in the memory is reduced. This can further reduce an amount of data for compression processing and an amount of data that needs to be migrated.

Further, the data stored in the memory when the device is suspended is reduced. Therefore, when the device needs to be woken up, only a relatively small amount of data needs to be read from the memory, and a working state can be rapidly restored. This can reduce a delay of reading data from the memory when the device is woken up, thereby accelerating a wakeup speed of the device.

In an example embodiment, before the device is controlled to enter the suspended state, memory space occupied by an inactive page in the memory may be further released.

In the foregoing technical solution, the memory space occupied by the inactive page is released. This can further reduce an amount of data saved in the memory when the device enters the suspended state.

In an example embodiment, after the device is controlled to enter the suspended state, if the device needs to be woken up, power supply to the other components may be first restored, and then the compressed data stored in the second part of memory units is decompressed and then migrated to the first part of memory units. In this way, the device may restore, based on data stored in the first part of memory units and the second part of memory units, a process that runs in the system before the device enters the suspended state.

In the foregoing technical solution, when the device needs to be woken up, the compressed and migrated data may undergo decompression processing and then be migrated back to an initial memory unit (that is, the first part of memory units), so that the processor reads the data from the corresponding memory unit to restore the process that runs in the system before the device enters the suspended state.

According to a third aspect, a computing device is provided. The computing device includes a processor, configured to implement the method described in the first aspect. The computing device may further include a memory, configured to store program instructions and data. The memory is coupled to the processor. The processor may invoke and execute the program instructions stored in the memory, to implement the method described in the first aspect.

In an example embodiment, the processor is configured to: when a system of the device is in an idle state, terminate a background process that is unrelated to a foreground process and that runs in the system, and release memory space occupied by the background process; store running information of the system in the memory of the device, where the running information of the system does not include information about the background process; and control the device to enter a suspended state.

According to a fourth aspect, a computing device is provided. The computing device includes a processor, configured to implement the method described in the second aspect. The computing device may further include a memory, configured to store program instructions and data. The memory is coupled to the processor. The processor may invoke and execute the program instructions stored in the memory, to implement the method described in the second aspect.

In an example embodiment, the processor is configured to: when a system of the device is in an idle state, save running information of the system to the memory of the device; compress data in a first part of memory units in the memory and then migrate compressed data to a second part of memory units in the memory, where the memory includes a plurality of memory units, occupied storage space in the first part of memory units is less than a threshold, and the second part of memory units includes a memory unit that stores data of an operating system and a memory unit whose occupied storage space is greater than or equal to the threshold; and control the device to enter a suspended state, where in the suspended state, other components in the device except the second part of memory units are powered off.

According to a fifth aspect, a computing device is provided. The computing device includes a release module, a storage module, and a control module. These modules may perform corresponding functions performed in any design example according to the first aspect. For example, the release module is configured to: when a system of the device is in an idle state, terminate a background process that is unrelated to a foreground process and that runs in the system, and release memory space occupied by the background process. The storage module is configured to store running information of the system in a memory of the device, where the running information of the system does not include information about the background process. The control module is configured to control the device to enter a suspended state.

According to a sixth aspect, a computing device is provided. The computing device includes a storage module and a control module. These modules may perform corresponding functions performed in any design example according to the second aspect. For example, the storage module is configured to: when a system of the device is in an idle state, save running information of the system to a memory of the device; and compress data in a first part of memory units in the memory and then migrate compressed data to a second part of memory units in the memory, where the memory includes a plurality of memory units, occupied storage space in the first part of memory units is less than a threshold, and the second part of memory units includes a memory unit that stores data of an operating system and a memory unit whose occupied storage space is greater than or equal to the threshold. The control module is configured to control the device to enter a suspended state, where in the suspended state, other components in the device except the second part of memory units are powered off.

According to a seventh aspect, an embodiment of this application provides a computer-readable storage medium. The computer-readable storage medium stores a computer program, the computer program includes program instructions, and when the program instructions are executed by a computer, the computer is enabled to perform the method according to any one of the first aspect or the second aspect.

According to an eighth aspect, an embodiment of this application provides a computer program product. The computer program product stores a computer program, the computer program includes program instructions, and when the program instructions are executed by a computer, the computer is enabled to perform the method according to any one of the first aspect or the second aspect.

According to a ninth aspect, this application provides a chip system. The chip system includes a processor, and may further include a memory, to implement the method according to the first aspect or the second aspect. The chip system may include a chip, or may include a chip and another discrete component.

For beneficial effects of the third aspect to the ninth aspect and the implementations thereof, refer to descriptions of beneficial effects of the method according to the first aspect or the second aspect and the implementations thereof.

DESCRIPTION OF EMBODIMENTS

Figure 1:
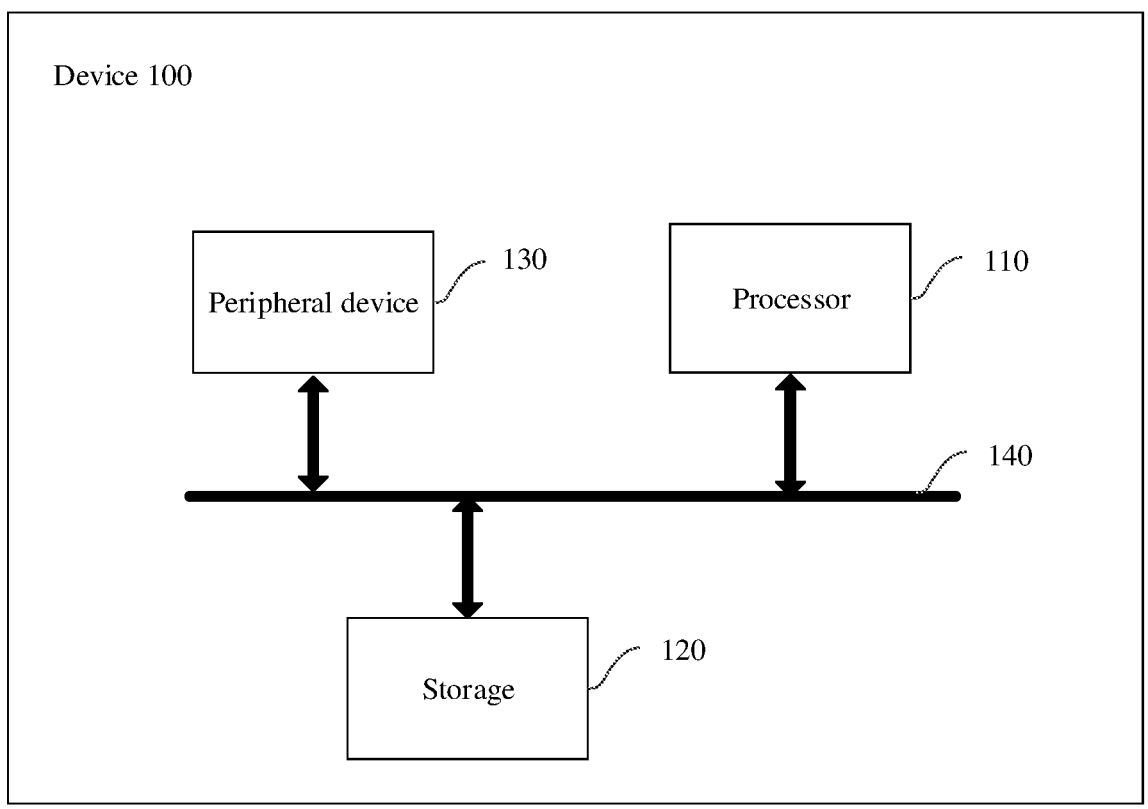
FIG. 1 is a schematic diagram of a structure of an example of a device according to an embodiment of this application.

To make the objectives, the technical solutions, and advantages of embodiments of this application clearer, the following further describes embodiments of this application in detail with reference to the accompanying drawings.

To help a person skilled in the art understand the technical solutions of this application, the following describes related technical terms in this application.

(1) A device may include a terminal device, a network device, or a mobile edge computing (MEC) device, or may be an Internet-of-things (IoT) device or the like. For example, the terminal device may include a mobile phone (or referred to as a "cellular" phone), a computer having a mobile terminal, a portable, pocket-sized, handheld, computer-built-in, or in-vehicle mobile apparatus, an intelligent wearable device, or the like. A network device may include an access network device, for example, include a device such as a base station or an access point that is configured to communicate with a wireless terminal by using one or more cells through an air interface in an access network. A core network device may include a data network (DN) device, a user data management (UDM) device, and the like.

(2) A system may include an operating system running in a device, various application programs installed in the device, various processes started when the device is running, register information corresponding to the various application programs or hardware in the device, and the like. The processes started when the device is running may include a foreground process or a background process. The operating system may be an operating system in a mobile phone, a watch, a tablet computer, or a base station. For example, the operating system may be a Windows system, a MAC OS system, a Linux system, an Android system, or the like, and certainly, may alternatively be a future-oriented system. The system described in embodiments of this application is intended to describe the technical solutions in embodiments of this application more clearly, but does not constitute a limitation on the technical solutions provided in embodiments of this application.

(3) A foreground process may be a process of processes in a running state that interacts with a user, or may be a process currently being used by a user. For example, a user uses a music playing program in a mobile phone to play music. At least one process used to support running of the music playing program is a foreground process. It should be noted that a process and a program are not in a one-to-one correspondence. One program may correspond to a plurality of processes. To be specific, a plurality of processes may execute a same program, but one process can correspond to only one program.

(4) A background process may be a process of processes in a running state that does not interact with a user; and may usually be a background service process. For example, a positioning service program is automatically started when a mobile phone of a user is started, but is not used by the user. Then, at least one process used to support running of the positioning service program is a background process.

Moreover, the foreground process and the background process are common definitions in the computer field; and certainly may have other names in some cases. For example, a foreground process is referred to as an active process, or a background process is referred to as an inactive process. Specific names are not limited herein. In embodiments of this application, "foreground process" and "background process" are used as examples for description.

(5) The term "a plurality of" in embodiments of this application means two or more. In view of this, "a plurality of" in embodiments of this application may also be understood as "at least two". "At least one" may be understood as one or more, for example, understood as one, two, or more. For example, "including at least one" means including one, two, or more, and does not limit which are included. For example, "including at least one of A, B, and C" means that A, B, C, A and B, A and C, B and C, or A and B and C may be included. The term "and/or" describes an association between associated objects and indicates that three relationships may exist. For example, "A and/or B" may indicate any one of the following three cases: Only A exists, both A and B exist, or only B exists. In addition, the character "/" generally indicates an "or" relationship between the associated objects unless otherwise stated.

Unless otherwise stated, ordinal numbers such as "first" and "second" in embodiments of this application are intended to distinguish between a plurality of objects, and are not intended to limit an order, a time sequence, priorities, or importance of the plurality of objects.

The following describes a device according to an embodiment of this application.

FIG. 1 is a schematic diagram of an example of a structure of a device 100. As shown in FIG. 1, the device 100 includes components such as a processor 110, a storage 120, and a peripheral device 130. It can be understood by a person skilled in the art that the structure of the computing device shown in FIG. 1 does not constitute a limitation on the device, and the computing device provided in this embodiment may include more or fewer components than those shown in the figure, combine some components, or have different component arrangements.

These components may perform communication through one or more buses 140 or signal lines. The bus may be classified into an address bus, a data bus, a control bus, and the like.

The processor 110 may be a central processing unit (CPU), an accelerated processing unit (APU), a graphics processing unit (GPU), a network processor (NP), or the like, or may be alternatively a combination of a plurality of the foregoing processors or the like. The processor 110 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

The storage 120 may include a volatile memory, for example, a random-access memory (RAM). Alternatively, the storage 120 may include a non-volatile memory, for example, a flash memory, a hard disk drive (HDD), or a solid-state drive (SSD). Alternatively, the storage 120 may include a combination of the foregoing types of storages. There may be one or more storages 120. A specific quantity may be set as needed. The storage 120 may alternatively be a storage in the processor 110. This is not limited herein.

The peripheral device 130 may include components such as a display, a speaker, and a microphone.

The storage 120 is configured to store code and data included in a system of the device 100, for example, code corresponding to an application program and code corresponding to an operating system. The storage 120 may include a memory, an external storage, and a register. The memory may be configured to store the operating system and code corresponding to an application program in a running state. The external storage and the register may be configured to store data generated by the application program in a running state in a running process. The external storage may be further configured to store data corresponding to other application programs that are not running. The processor 110 may fetch code or data stored in the external storage to the memory, to implement a function defined by the code. For example, during startup of the device 100, the processor 110 may fetch the code corresponding to the operating system to the memory, to implement various functions of the operating system on the device 100. The processor 110 may also fetch, based on a user requirement, code corresponding to another application program to the memory, to implement various functions of the application program on the device 100.

One of factors that affect use of the device 100 is a problem that power consumption of the device is relatively high. In a related technology, to reduce power consumption of a device, a device suspension and restoration method, namely STR, is provided. In the method, when a system of the device is in an idle state, data corresponding to each task running in the system, data in a cache, and the like are saved to a random access memory. A CPU and some components are powered off, so that the device is in a low power consumption state. When the device needs to be used, corresponding data is read from the random access memory to unfreeze the tasks and restore the entire system.

However, after suspending to random access memory is performed, all data is stored in the random access memory. When the device needs to be woken up, data needs to be read from the random access memory. A data reading process has a specific delay, resulting in a relatively slow wakeup speed of the system. Therefore, how to balance power consumption and a wakeup speed of a device is a technical problem that needs to be resolved urgently at present.

In view of this, embodiments of this application provide a device suspension method. In this method, data stored in a memory when a device is suspended is reduced. Therefore, when the device needs to be woken up, only a relatively small amount of data needs to be read from the memory, and a working state can be rapidly restored. This can reduce a delay of reading data from the memory when the device is woken up, thereby accelerating a wakeup speed of the device. In addition, the data is stored in the memory when the device is suspended. Therefore, in a suspended state, power needs to be supplied only to the memory of the device, thereby ensuring low power consumption of the device, and achieving balance between power consumption and a wakeup speed of the device.

The following describes, with reference to the accompanying drawings, the method provided in embodiments of this application. For ease of description, the following uses an example in which the method is applied to the device 100 shown in FIG. 1.

Figure 2:
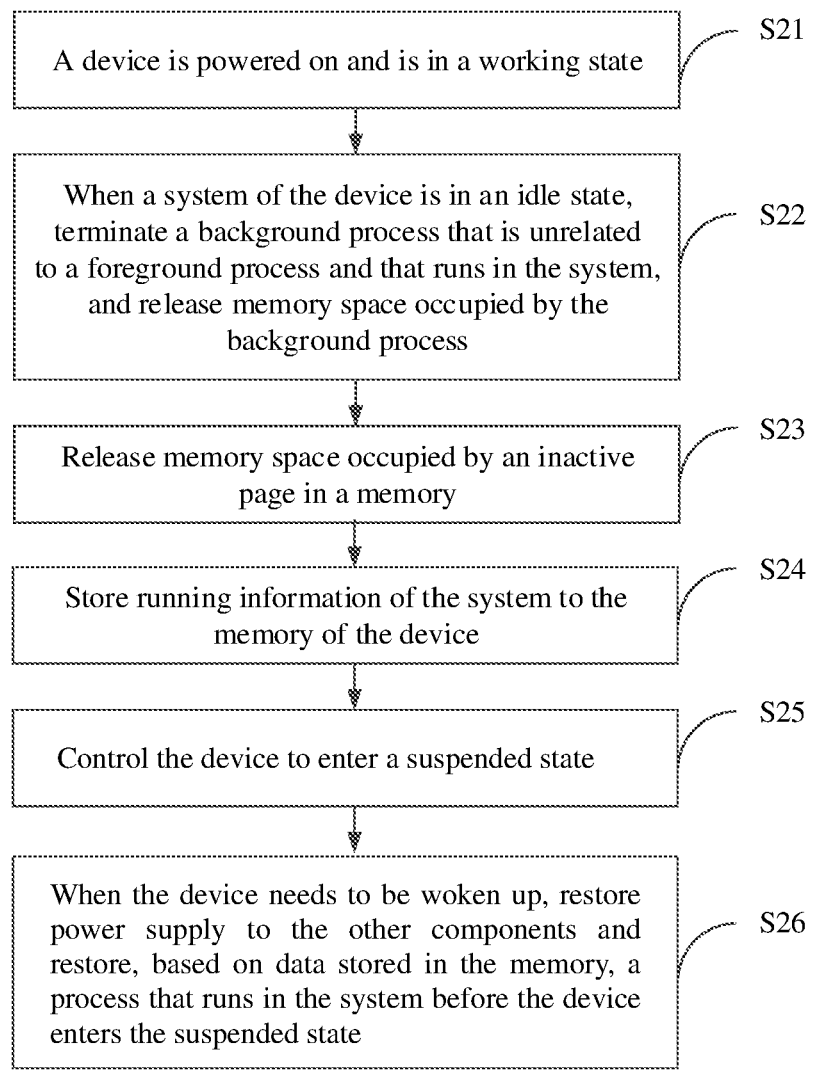
FIG. 2 is a flowchart of an example of a device suspension method according to an embodiment of this application.

FIG. 2 is a flowchart of a device suspension method according to an embodiment of this application. The flowchart is described as follows:

S21. A device is powered on and is in a working state.

After the device 100 is powered on, the processor 110 of the device 100 saves the code corresponding to the operating system of the device 100 to the memory, and then executes the code in the memory to start the device 100. Then, the processor 110 may start an application program based on an operation of a user. For example, the processor 110 detects an operation of starting a music playing application program by the user. Then, the processor 110 saves code corresponding to the application program from the external storage to the memory, and executes the code to play music. Certainly, the processor 110 may also execute an application program that is preset in the operating system and that starts automatically upon startup, for example, a positioning application program. A specific execution process is similar to the process of starting the music playing application program. Details are not described herein again.

S22. When a system of the device is in an idle state, terminate a background process that is unrelated to a foreground process and that runs in the system, and release memory space occupied by the background process.

After the device 100 is started, the processor 110 may determine, based on whether an operation instruction for the device 100 from the user is detected within a preset duration, whether the system of the device 100 is in the idle state. For example, the preset duration is 30 seconds. When the processor 110 does not detect any operation instruction for the device 100 from the user within 30 seconds, the processor 110 determines that the system of the device 100 is in the idle state. It should be noted that the foregoing process of determining whether the system is in the idle state is only an example. Whether the device is in the idle state may alternatively be determined in another manner. For example, an operation of the user for controlling the device to be in the idle state is detected. Then, the device enters the idle state based on the operation of the user. This is not limited in embodiments of this application.

When it is determined that the system is in the idle state, to reduce occupied memory space, the processor 110 may terminate the background process that is unrelated to the foreground process and that runs in the system, and release the memory space occupied by the background process. The background process that is unrelated to the foreground process may be a background process that when terminated, use of the foreground process is not affected.

For example, the processor 110 may obtain a process tree that includes processes running in the system, and then determine the background process that is unrelated to the foreground process based on the process tree. The process tree is used to indicate a dependency relationship between a plurality of processes. For example, a first process is a subprocess of a second process. This indicates that the first process is related to the second process or the first process depends on the second process.

Figure 3:
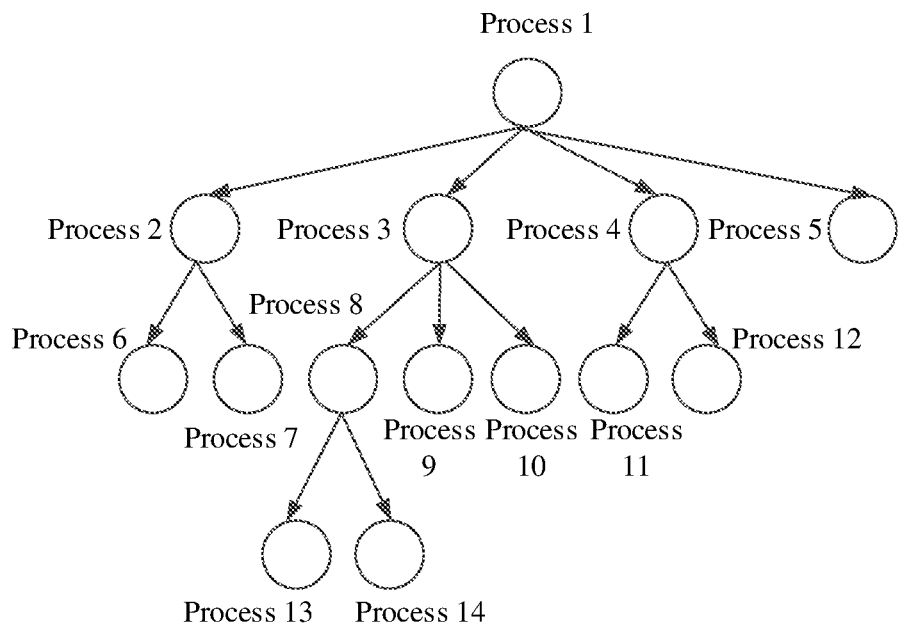
FIG. 3 is a schematic diagram of an example of a process tree obtained by a processor according to an embodiment of this application.

FIG. 3 is a schematic diagram of an example of a process tree obtained by the processor 110. As shown in FIG. 3, processes in a running state in the operating system of the device 100 include a process 1 to a process 14. The process 1 is an initial (init) process. The process 2 to the process 5 are subprocesses of the init process. In other words, the process 2 to the process 5 depend on the init process. The process 6 and the process 7 are subprocesses of the process 2, the process 8 to the process 10 are subprocesses of the process 3, the process 11 and the process 12 are subprocesses of the process 4, and the process 13 and the process 14 are subprocesses of the process 8. Then, the processor 110 determines the foreground process and the background process based on whether each process interacts with the user. For example, the processor 110 determines that the process 10 to the process 14 are foreground process; and that all other processes except the init process, that is, the process 2 to the process 9, are background processes. After determining the foreground process and the background process, the processor 110 can determine, based on the process tree, that a background process related to the foreground process 10 is the process 3, that background processes related to the foreground process 11 and the foreground process 12 are both the process 4, and that background processes related to the foreground process 13 and the foreground process 14 are both the process 8. Then, background processes, among the process 2 to the process 9, that are unrelated to a foreground process are the process 2, the process 5 to the process 7, and the process 9.

Certainly, the processor 110 may alternatively determine, in another manner, the background process that is unrelated to the foreground process. This is not limited herein.

After determining the background process that is unrelated to the foreground process, the processor 110 terminates the background process that is unrelated to the foreground process, and releases the memory space occupied by the background process.

It should be noted that, to further reduce memory space occupied by processes, in addition to terminating the background process that is unrelated to the foreground process, the processor 110 may further terminate some foreground processes. For example, the processor 110 may collect statistics about a quantity of interactions between each foreground process and the user, and then terminate a foreground process with a smallest quantity of interactions or with a quantity of interactions less than a preset quantity. This is not limited herein. In this embodiment, as an example for description, the processor 110 terminates only the background process that is unrelated to the foreground process.

S23. Release memory space occupied by an inactive page in a memory.

When the device 100 is in a working state, for ease of memory space management, the operating system may form an active page list and an inactive page list based on an access frequency of each memory page. For example, a frequently accessed memory page or a memory page with an access frequency higher than or equal to a preset quantity is saved to the active page list, and a memory page that is not frequently accessed or has an access frequency lower than the preset quantity is saved to the inactive page list. Certainly, the inactive page list may also include an invalid page. The invalid page may be a memory page occupied by a terminated process, or the like. This is not limited herein.

Figure 4:
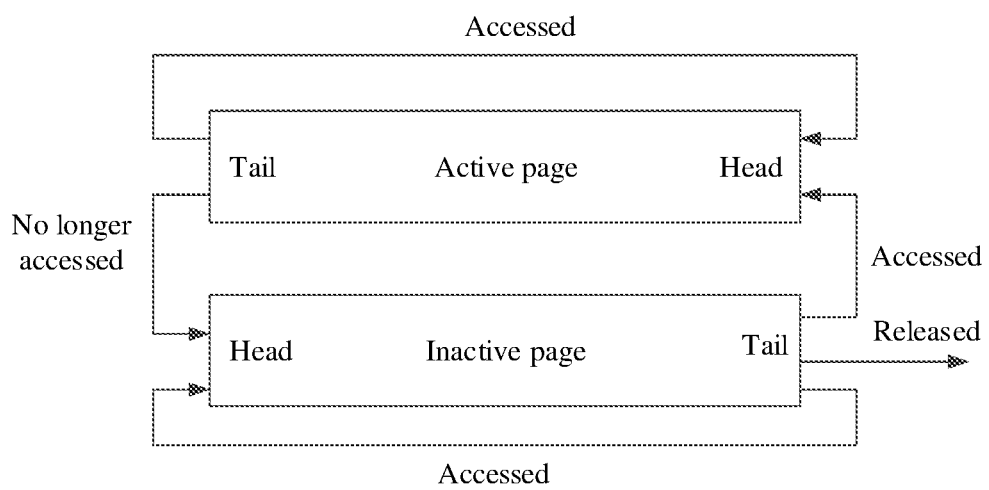
FIG. 4 is a schematic diagram of an example of an active page list and an inactive page list according to an embodiment of this application.

For example, referring to FIG. 4, if a memory page in the inactive page list has just been accessed, the processor 110 migrates the memory page from the inactive page list to a head of the active page list. If a memory page at a tail of the active page list has just been accessed, the processor 110 migrates the memory page from the tail of the active page list to the head of the active page list. If a memory page at the tail of the active page list has not been accessed for a long time, the processor 110 migrates the memory page to a head of the inactive page list. In addition, the processor 110 also sorts memory pages in the inactive page list in real time based on an access frequency of each memory page in the inactive page list. A memory page with a low access frequency is placed near a tail, and a memory page with a high access frequency is placed near the head.

Therefore, in this embodiment, to further reduce memory space occupied by processes, when determining that the operating system is in an idle state, the processor 110 may release a memory page at the tail of the inactive page list or memory pages in the entire inactive page list, or migrate data in a memory page at the tail of the inactive page list or data in memory pages in the entire inactive page list to the external storage of the device 100.

It should be noted that step S23 is an optional step, in other words, step S23 is not mandatory. In addition, if step S23 is performed, in this embodiment, an execution sequence between step S22 and step S23 is not limited. For example, step S22 may be performed before step S23, step S23 may be performed before step S22, or step S22 and step S23 may be performed at the same time.

S24. Store running information of the system to the memory of the device.

In this embodiment, the running information of the system may include computer code and data generated in a running process of the operating system; computer code, a process, and data that correspond to an application program in a running state; register information corresponding to various hardware components of the device, for example, the memory, the processor 110, and the register; and the like; and may further include modified data in a cache. One-by-one enumeration is not provided herein. However, the running information of the system does not include information about the background process that is unrelated to the foreground process and that has been terminated. If the processor 110 has also performed step S23, the running information of the system does not include data in the inactive page either.

Storing the running information of the system to the memory of the device mainly means storing, to the memory, information that is of the running information of the system and that is stored outside the memory. For example, running information of the system stored in the register or the cache is stored to the memory. This step does not need to be performed for a part of data that is of the running information of the system and that has been saved in the memory.

S25. Control the device to enter a suspended state.

After performing the foregoing steps, the processor 110 controls the device to enter the suspended state. In this embodiment, controlling the device to enter a suspended state includes: powering off other components in the device except the memory. The other components include the processor of the device.

S26. When the device needs to be woken up, restore power supply to the other components and restore the system based on data stored in the memory, where the restoring the system includes restoring a process that runs in the system before the device enters the suspended state.

Certainly, if the processor 110 stores the running information of the system in the register to the memory before the device enters the suspended state, after restoring power supply to the other components, the processor 110 may rewrite this part of data back to the register, and then restore the system based on the data in the memory and data in the register. In this embodiment, the restoring the system based on data stored in the memory includes: based on the data in the memory and the data in the register, restoring the operating system of the device and a process running in the system, restoring various hardware components of the device to a working state, and the like. For example, a process that runs in the system before the device enters the suspended state may be restored based on stored information about the process.

In addition, if the system needs to restore the terminated background process, the corresponding background process needs to be re-created. If the system needs to use data in the released inactive page, data may be read again from a storage location of the data as in a page missing case.

In the foregoing technical solution, before the device enters the suspended state, the memory of the device does not store the background process that is unrelated to the foreground process. In other words, data stored in the memory when the device is suspended is reduced. Therefore, when the device needs to be woken up, only a relatively small amount of data needs to be read from the memory, and a working state can be rapidly restored. This can reduce a delay of reading data and restoring data from the memory when the device is woken up, thereby accelerating a wakeup speed of the device. In addition, the data is stored in the memory when the device is suspended. Therefore, in the suspended state, power needs to be supplied only to the memory of the device, thereby ensuring low power consumption of the device.

Figure 5:
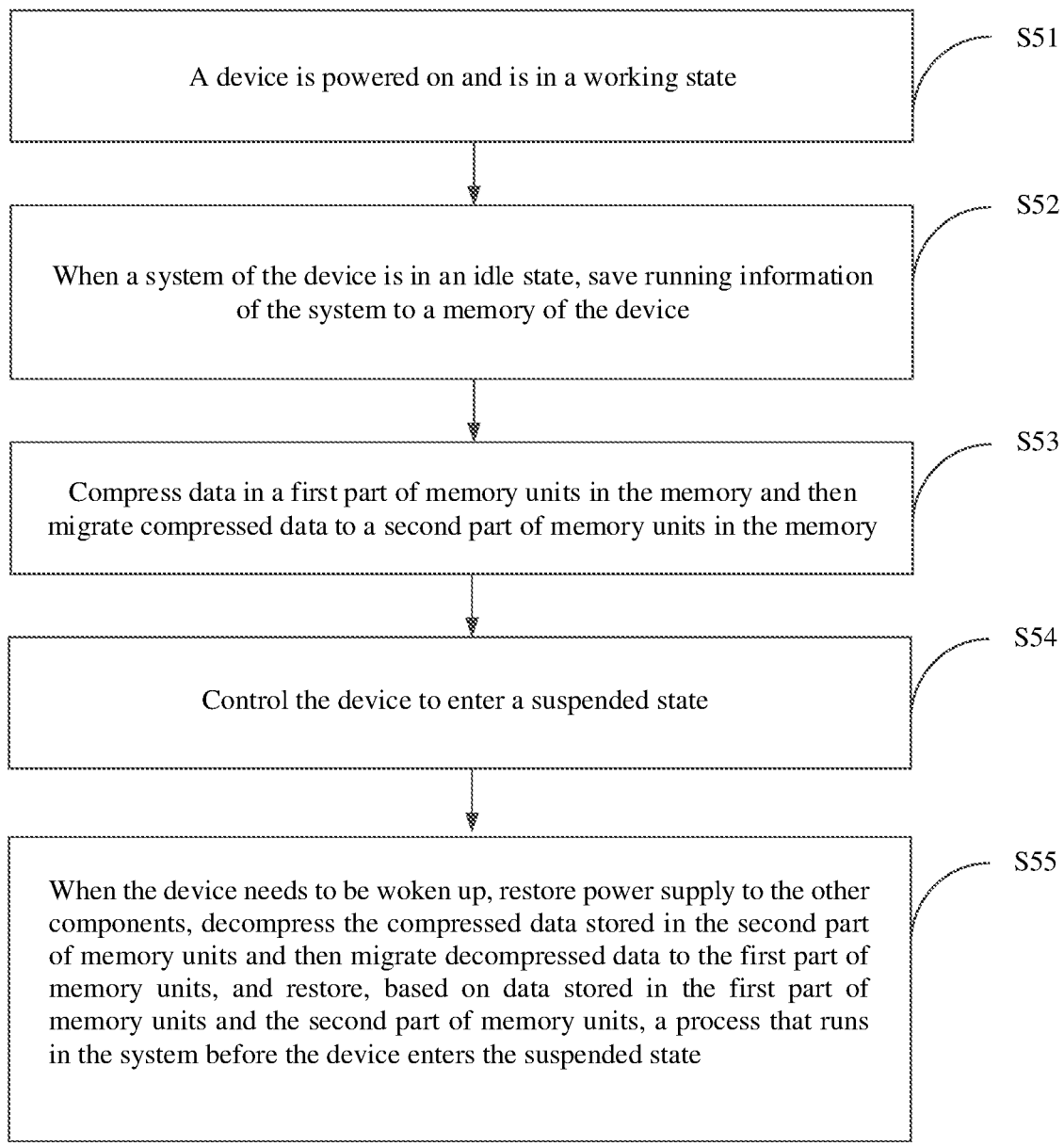
FIG. 5 is a flowchart of another example of a device suspension method according to an embodiment of this application.

In the embodiment shown in FIG. 2, balance between the power consumption and the wakeup speed of the device is mainly implemented by accelerating the wakeup speed of the device. In another embodiment, balance between the power consumption and the wakeup speed of the device may be implemented by further reducing power consumption of the device. FIG. 5 is a flowchart of another example of a device suspension method according to an embodiment of this application. The flowchart is described as follows:

S51. A device is powered on and is in a working state.

Step S51 is similar to step S21, and is not described herein again.

S52. When a system of the device is in an idle state, save running information of the system to a memory of the device.

A manner in which a processor 110 determines whether the system is in the idle state is similar to that in step S22. Details are not described herein again. In this embodiment, the running information of the system may include computer code and data generated in a running process of an operating system; computer code, a process, and data that correspond to an application program in running state; register information corresponding to various hardware components of the device, for example, the memory, the processor 110, and a register; and the like; and may further include modified data in a cache. One-by-one enumeration is not provided herein. When determining that the system is in the idle state, the processor 110 saves the running information of the system in the memory.

S53. Compress data in a first part of memory units in the memory and then migrate compressed data to a second part of memory units in the memory.

In this embodiment, the memory of the device includes a plurality of memory units. A memory unit may be a memory module, a memory chip, a memory granule, or the like. The memory units are not limited herein.

The processor 110 may record a storage space occupation status of each of the plurality of memory units, and then selectively compress and migrate data stored in the memory units based on the storage space occupation status of each memory unit. For example, the plurality of memory units are categorized into the first part of memory units and the second part of memory units based on the storage space occupation status of each memory unit. The first part of memory units includes at least one memory unit, and the second part of memory units also includes at least one memory unit. Occupied storage space in the first part of memory units is less than a threshold, and the second part of memory units includes a memory unit that stores data of the operating system and a memory unit whose occupied storage space is greater than or equal to the threshold. The threshold may be preset, or may be determined by the processor 110 based on the storage space occupation status of each memory unit. For example, the plurality of memory units are sorted in descending order based on occupied storage space. Then, the threshold is set to a value of occupied storage space of a memory unit located at a middle location after the sorting. Certainly, the threshold may alternatively be set in other manners, which are not described one by one herein.

Figure 6:
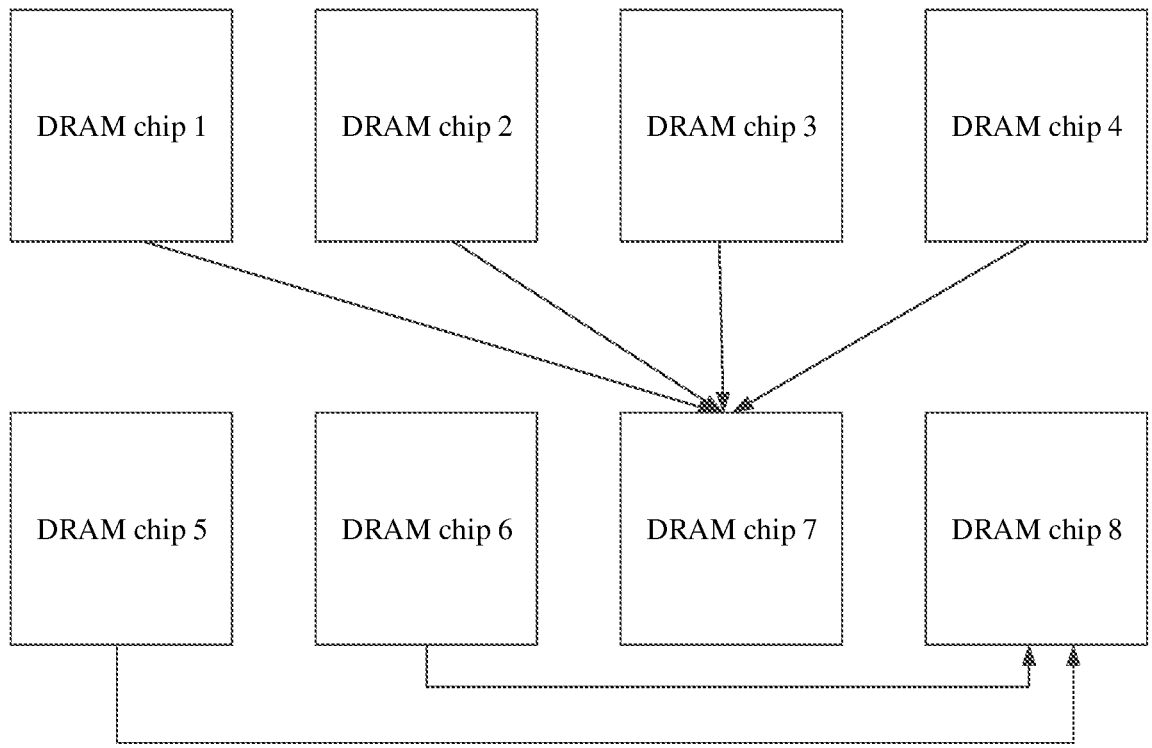
FIG. 6 is a schematic diagram of an example of compressing data in a first part of memory units and migrating compressed data to a second part of memory units in a memory according to an embodiment of this application.

For example, referring to FIG. 6, memory units are dynamic random access memory (DRAM) chips, and a memory of a device 100 includes eight DRAM chips: a DRAM chip 1 to a DRAM chip 8.

A processor 110 may record a storage space occupation status of each DRAM chip. For example, occupied storage space of each of the DRAM chip 1 to the DRAM chip 4 is 10%, occupied storage space of the DRAM chip 5 and the DRAM chip 6 is 5%, the DRAM chip 7 stores data of an operating system and occupied storage space of the DRAM chip 7 is 21%, and occupied storage space of the DRAM chip 8 is 21%.

Then, the processor 110 categorizes the eight DRAM chips into a first part of memory units and a second part of memory units based on a preset threshold, for example, 20%. The occupied storage space of each of the DRAM chip 1 to the DRAM chip 6 is less than 20%, the occupied storage space of the DRAM chip 7 and the DRAM chip 8 is greater than 20%, and the data of the operating system is stored in the DRAM chip 7. Therefore, the processor 110 categorizes the DRAM chip 1 to the DRAM chip 6 as the first part of memory units, and categorizes the DRAM chip 7 and the DRAM chip 8 as the second part of memory units.

Further, the processor 110 compresses data in the first part of memory units, that is, compresses data in the DRAM chip 1 to the DRAM chip 6; and migrates compressed data to the DRAM chip 7 and the DRAM chip 8. In FIG. 6, for example, compressed data in the DRAM chip 1 to the DRAM chip 4 is migrated to the DRAM chip 7, and compressed data in the DRAM chip 5 and the DRAM chip 6 is migrated to the DRAM chip 8. In this embodiment, the processor 110 may invoke a computer program of corresponding compression software to compress the data in the DRAM chip 1 to the DRAM chip 6. Alternatively, the device 100 further includes a dedicated component for data compression, and the processor 110 may control the component to compress the data in the DRAM chip 1 to the DRAM chip 6. This is not limited herein.

Certainly, in the foregoing example, alternatively, all the data in the first part of memory units may be migrated to one memory unit of the second part of memory units. For example, the data in the DRAM chip 1 to the DRAM chip 6 is compressed and then migrated to the DRAM chip 7. In addition, to further reduce a quantity of memory units occupied by running information of the operating system, data in a memory unit that is of the second part of memory units and that does not store the data of the operating system may be also migrated to the memory unit that stores the data of the operating system. For example, data in the DRAM chip 8 is migrated to the DRAM chip 7. A specific migration manner is not limited herein.

The running information of the system saved in the memory is compressed, thereby reducing memory space occupied by the running information of the system. Further, the compressed data is migrated to some memory units, for example, migrated to a second part of the memory that includes the memory unit that stores the data of the operating system and the memory unit whose occupied storage space is greater than or equal to the threshold. In this way, the running information of the system is stored only in the second part of memory units, thereby reducing a quantity of memory units occupied by the running information of the system.

It should be noted that, if the threshold is set to a relatively large value, for example, 80% of storage space of a single memory unit, to minimize a quantity of memory units occupied by the running information of the system, when an amount of data stored in each memory unit is relatively large, for example, is 60%, an amount of data that needs to be compressed and migrated is also relatively large. This brings relatively large compression and migration overheads to the system. Therefore, proper setting of the threshold for categorizing the memory units can avoid excessively large compression and migration overheads while minimizing the quantity of memory units occupied by the running information of the system.

In addition, in some cases, if an amount of data stored in the first part of memory units is excessively large and cannot be stored in the second part of memory units even after the data is compressed, the compressed data may be alternatively stored in the first part of memory units. For example, in the foregoing example, the DRAM chip 1 to the DRAM chip 6 are the first part of memory units, and the DRAM chip 7 and the DRAM 8 are the second part of memory units. When storage space in the DRAM chip 7 and the DRAM 8 is insufficient, compressed data may alternatively be stored in one of the DRAM chip 1 to the DRAM chip 6, for example, stored in the DRAM chip 6. In this way, the compressed data occupies only three DRAM chips. This can also reduce the quantity of memory units occupied by the running information of the system.

Alternatively, if an amount of data stored in the first part of memory units is excessively large and cannot be stored in remaining storage space in the second part of memory units even after the data is compressed, data in the second part of memory units may also be compressed, to reduce storage space occupied by the data in the second part of memory units.

S54. Control the device to enter a suspended state.

Different from the embodiment shown in FIG. 2, in this embodiment, when the device is controlled to enter the suspended state, other components in the device except the second part of memory units need to be powered off. The other components include the processor.

In this way, when the device enters the suspended state, power may be supplied only to the second part of memory units, without a need to supply power to the entire memory, thereby reducing power consumption of the device in the suspended state.

Figure 7:
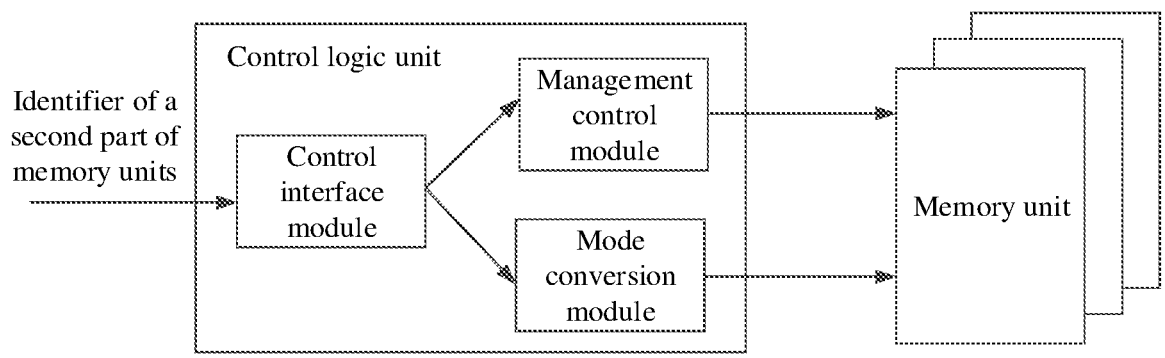
FIG. 7 is a schematic diagram of a structure of a memory according to an embodiment of this application.

For example, FIG. 7 is a schematic diagram of a structure of a memory provided in this application. As shown in FIG. 7, the memory may include a control logic unit. The control logic unit includes a control interface module, a mode conversion module, and a management control module that supplies power independently to each memory unit. The control interface module is configured to indicate the mode conversion module whether to be in a suspended state or in a running state. The management control module adjusts a power supply status of the memory units based on a state indicated by the mode conversion module. If the mode conversion module indicates a suspended state, the management control module needs to supply power to some memory units based on information input by the control interface module. If the mode conversion module indicates a running state, the management control module needs to supply power to all the memory units. When the mode conversion module indicates a suspended state, the control interface module may receive an identifier that is of a memory unit to which power needs to be supplied and that is sent by the processor 110 (that is, an identifier of the second part of memory units), and send the information to the management control module, so that the management control module supplies power only to the second part of memory units.

S55. When the device needs to be woken up, restore power supply to the other components, decompress the compressed data stored in the second part of memory units and then migrate decompressed data to the first part of memory units, and restore the system based on data stored in the first part of memory units and the second part of memory units.

When the device enters the suspended state, the processor 110 compresses and migrates the data in the first part of memory units. Therefore, when the device is woken up, the compressed and migrated data needs to be rewritten back to an initial location, that is, written back to the first part of memory units. Then, the system is restored based on data in the memory units and data in the register. In this embodiment, that the system is restored based on data in the memory units and data in the register includes: based on the data in the memory and the data in the register, the operating system of the device and a process running in the system are restored, various hardware components of the device are restored to a working state, and the like. For example, the processor 110 may read, from the first part of memory units, information about a process running in the system before the device enters the suspended state, to unfreeze the process and restore to a process status before the device enters the suspended state. Based on the data in the memory and the data in the register, the processor 110 may also restore the operating system of the device and the process running in the system, restore various hardware components of the device to a working state, and the like.

In this embodiment, the processor 110 may simultaneously perform a process of restoring the operating system based on the data corresponding to the operating system in the second part of memory units and a process of decompressing the compressed and migrated data and writing the data back to the initial location, to accelerate a wakeup speed of the device.

It should be noted that, to further accelerate the wakeup speed of the device, after power supply to the other components in the device is restored, the data in the first part of memory units may undergo only a decompression operation, and then decompressed data is directly migrated to a register corresponding to the data before the compression. In this case, when the data in the first part of memory units is compressed, location flag information may be added to compressed data. The location flag information may be used to indicate an address of a register at which the data is located before undergoing the compression processing. In this way, after the data is decompressed, the data may be directly written back to the corresponding register based on the location flag information, without a need to first write the decompressed data to the first part of memory units and then write the data from the first part of memory units to the register. This shortens a processing process of the processor and accelerates the wakeup speed of the device.

The embodiments shown in FIG. 2 and FIG. 5 respectively describe the device suspension method provided in this application from two aspects. In some cases, alternatively, the embodiments shown in FIG. 2 and FIG. 5 may be combined in use. For example, step S53 in the embodiment shown in FIG. 5 is added after step S24 in the embodiment shown in FIG. 2, to obtain a flowchart shown in FIG. 8.

S81. A device is powered on and is in a working state.

S82. When a system of the device is in an idle state, terminate a background process that is unrelated to a foreground process and that runs in the system, and release memory space occupied by the background process.

S83. Release memory space occupied by an inactive page in a memory.

S84. Store running information of the system in the memory of the device.

S85. Compress data in a first part of memory units in the memory and then migrate compressed data to a second part of memory units in the memory.

S86. Control the device to enter a suspended state.

In this embodiment, when the device is controlled to enter the suspended state, other components in the device except the second part of memory units need to be powered off. The other components include a processor.

S87. When the device needs to be woken up, restore power supply to the other components, decompress the compressed data stored in the second part of memory units and then migrate decompressed data to the first part of memory units, and restore, based on data stored in the first part of memory units and the second part of memory units, a process that runs in the system before the device enters the suspended state.

Step S81 to step S84 are similar to step S21 to step S24, and step S85 to step S87 are similar to step S53 to step S55. Details are not described herein again.

Figure 8:
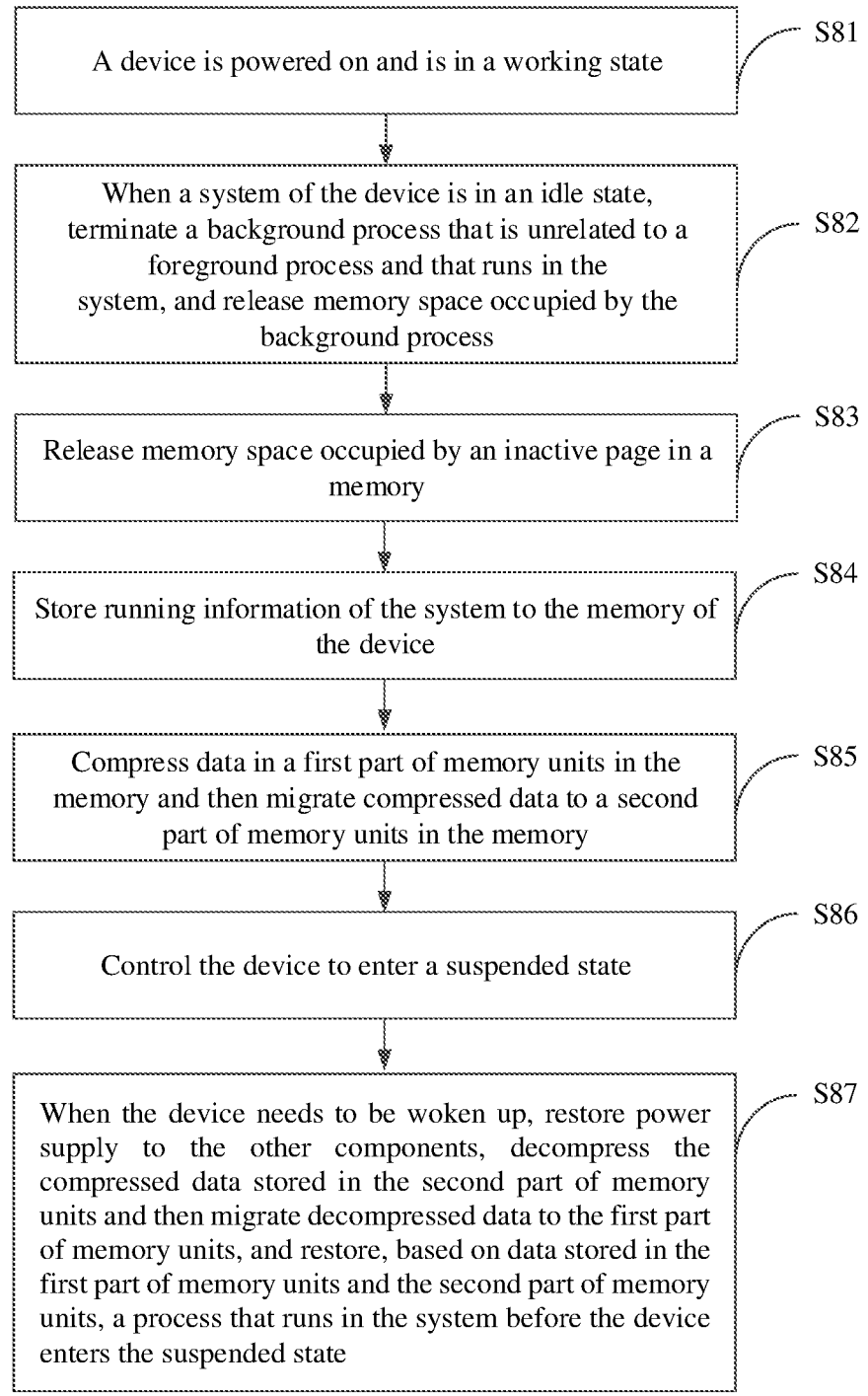
FIG. 8 is a flowchart of another example of a device suspension method according to an embodiment of this application.

In other words, in the embodiment shown in FIG. 8, when the device enters the suspended state, first, the background process that is unrelated to the foreground process is terminated and released and the memory space occupied by the inactive page is released, to reduce an amount of data saved in the memory. Then, data saved in the memory is compressed and migrated, to reduce a quantity of memory units to which power needs to be supplied in the suspended state. In addition, the amount of data stored in the memory is also reduced. This can further reduce an amount of data for compression processing and an amount of data that needs to be migrated. In this way, when the device is controlled to enter the suspended state, power may be supplied only to some memory units, without a need to supply power to the entire memory, thereby reducing power consumption of the device in the suspended state. Moreover, data stored in the memory when the device is suspended is reduced. Therefore, when the device needs to be woken up, only a relatively small amount of data needs to be read from the memory, and a working state can be rapidly restored. This can reduce a delay of reading data from the memory when the device is woken up, thereby accelerating a wakeup speed of the device.

In the foregoing embodiments provided in this application, to implement the functions in the method provided in the foregoing embodiments of this application, the device may include a hardware structure and/or a software module, to implement the foregoing functions by using the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 9:
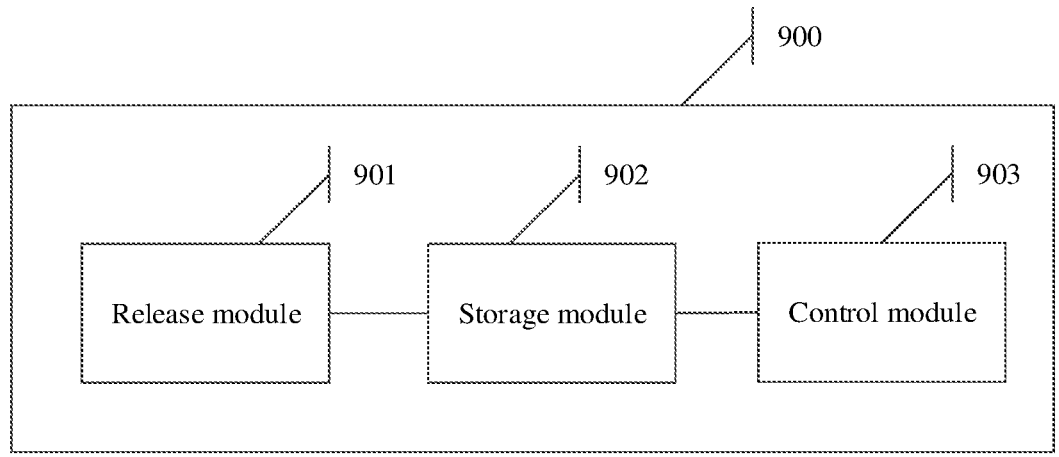
FIG. 9 is a schematic diagram of a structure of an example of a computing device according to an embodiment of this application.

FIG. 9 is a schematic diagram of a structure of a computing device 900. The computing device 900 may be a hardware structure, a software module, or a combination of a hardware structure and a software module. The computing device 900 may be implemented by a chip system. In this embodiment, the chip system may include a chip, or may include a chip and another discrete component.

The computing device 900 may include a release module 901, a storage module 902, and a control module 903.

The release module 901 may be configured to perform step S22 and step S23 in the embodiment shown in FIG. 2, or configured to perform step S82 and step S83 in the embodiment shown in FIG. 8, and/or configured to support another process of the technology described in this specification.

The storage module 902 may be configured to perform step S24 in the embodiment shown in FIG. 2, or configured to perform step S52 and step S53 in the embodiment shown in FIG. 5, or configured to perform step S84 and step S85 in the embodiment shown in FIG. 8, and/or configured to support another process of the technology described in this specification.

The control module 903 may be configured to perform step S21, step S25, and step S26 in the embodiment shown in FIG. 2; or configured to perform step S51, step S54, and step S55 in the embodiment shown in FIG. 5; or configured to perform step S81, step S86, and step S87 in the embodiment shown in FIG. 8, and/or configured to support another process of the technology described in this specification.

All related content of the steps in the foregoing method embodiments may be cited in function descriptions of corresponding functional modules. Details are not described herein again.

In the embodiment shown in FIG. 9, division into the modules is an example, and is merely logical function division. There may be another division manner in an actual implementation. In addition, functional modules in embodiments of this application may be integrated into one processor, or each of the modules may exist alone physically, or at least two modules may be integrated into one module. The integrated module may be implemented in a form of hardware, or may be implemented in a form of a software functional module.

Figure 10:
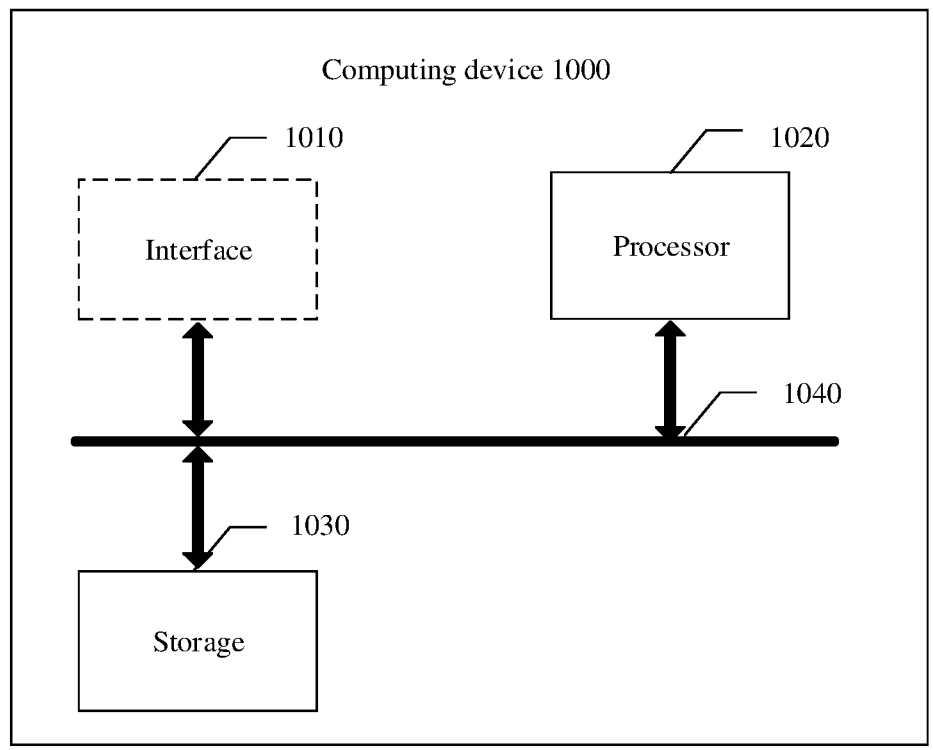
FIG. 10 is a schematic diagram of a structure of another example of a computing device according to an embodiment of this application.

FIG. 10 shows a computing device 1000 according to an embodiment of this application. The computing device 1000 may be a chip system. In this embodiment, the chip system may include a chip, or may include a chip and another discrete component.

The computing device 1000 includes at least one processor 1020, configured to implement or configured to support the computing device 1000 in implementing a function of a storage service end in the method provided in embodiments of this application. For example, the processor 1020 may terminate a background process that is unrelated to a foreground process and that runs in the system, and may compress data in a first part of memory units in a memory and then migrate compressed data to a second part of memory units in the memory. For details, refer to detailed descriptions in the method examples. Details are not described herein again.

The computing device 1000 may further include at least one storage 1030, including a memory and configured to store program instructions and/or data. The storage 1030 is coupled to the processor 1020. Coupling in this embodiment may be indirect coupling or a communication connection between apparatuses, units, or modules in an electrical form, a mechanical form, or another form, and is used for information exchange between the apparatuses, the units, or the modules. The processor 1020 may operate in collaboration with the storage 1030. The processor 1020 may execute the program instructions stored in the storage 1030. At least one of the at least one storage may be included in the processor.

The computing device 1000 may further include an interface 1010, configured to enable components in the computing device 1000 to communicate with each other by using a transmission medium.

In this embodiment, a specific connection medium between the interface 1010, the processor 1020, and the storage 1030 is not limited. In this embodiment, the storage 1030, the processor 1020, and the interface 1010 are connected through a bus 1040 in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment, the processor 1020 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to embodiments of this application may be directly presented as being performed and completed by a hardware processor, or performed and completed by a combination of hardware and a software module in the processor.

In this embodiment, the storage 1030 may be a non-volatile memory, such as a hard disk drive (HDD) or a solid-state drive (SSD), or may be a volatile memory, such as a random access memory (RAM). The storage is any other medium that can be configured to carry or store expected program code in a form of instructions or a data structure and that can be accessed by a computer, but is not limited thereto. The storage in embodiments of this application may alternatively be a circuit or any other apparatus that can implement a storage function, and is configured to store program instructions and/or data.

An embodiment of this application further provides a computer-readable storage medium, including instructions. When the instructions are run on a computer, the computer is enabled to perform the method performed by the device in the embodiment shown in FIG. 2, FIG. 5, or FIG. 8.

An embodiment of this application further provides a computer program product, including instructions. When the instructions are run on a computer, the computer is enabled to perform the method performed by the device in the embodiment shown in FIG. 2, FIG. 5, or FIG. 8.

An embodiment of this application provides a chip system. The chip system includes a processor, may further include a storage, and is configured to implement the functions of the device in the foregoing method. The chip system may include a chip, or may include a chip and another discrete component.

All or a part of the methods in embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to embodiments of this application are completely or partially generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

What is claimed is:

1. A device suspension method, comprising:
when a system of a device is in an idle state, terminating a background process that is unrelated to a foreground process and that runs in the system, and releasing memory space occupied by the background process;
storing running information of the system in a memory of the device, wherein the running information of the system does not comprise information about the background process; and
controlling the device to enter a suspended state,
wherein the memory of the device comprises a plurality of memory units, and the controlling the device to enter a suspended state comprises powering off components in the device other than at least a part of the memory units in the memory of the device, and
wherein before the controlling the device to enter a suspended state, the method further comprises:
compressing data in a first part of memory units in the memory and then migrating compressed data to a second part of memory units in the memory, wherein occupied storage space in the first part of memory units is less than a threshold, and the second part of memory units comprises a memory unit that stores data of an operating system and a memory unit whose occupied storage space is greater than or equal to the threshold; and
the controlling the device to enter a suspended state comprises:
powering off components in the device other than the second part of memory units.

2. The method according to claim 1, wherein before the controlling the device to enter a suspended state, the method further comprises:
releasing memory space occupied by an inactive page in the memory.

3. The method according to claim 2, further comprising:
when the system of the device is in a working state, forming an active page list and an inactive page list based on an access frequency of each memory page in the memory of the device.

4. The method according to claim 3, wherein the forming an active page list and an inactive page list comprises:
saving each memory page with an access frequency higher than or equal to a preset quantity into the active page list, and saving each memory page that has an access frequency lower than the preset quantity into the inactive page list.

5. The method according to claim 3, wherein the releasing memory space occupied by an inactive page in the memory comprises releasing at least a part of the memory pages stored in the inactive page list.

6. The method according to claim 1, further comprising:
restoring power supply to the components in the device other than the second part of memory units;
decompressing the compressed data stored in the second part of memory units and then migrating decompressed data to the first part of memory units; and restoring, based on data stored in the first part of memory units and the second part of memory units, a process that runs in the system before the device enters the suspended state.

7. The method according to claim 1, wherein execution of the foreground process is not affected when the background process is terminated.

8. The method according to claim 1, further comprising:
obtaining a process tree for processes running in the system, the process tree indicating dependency relationships between the processes running in the system; and
determining the background process unrelated to the foreground process based on the process tree.

9. The method according to claim 8, wherein a process in the system depends on another process in the system when the process is a subprocess of said another process.

10. The method according to claim 1, further comprising:
when the system of the device is in the idle state, terminating an inactive foreground process whose number of interactions with a user is less than an interaction threshold, and releasing memory space occupied by the inactive foreground process, wherein the running information of the system does not comprise information about the inactive foreground process.

11. A device suspension method, comprising:
when a system of a device is in an idle state, saving running information of the system to a memory of the device;
compressing data in a first part of memory units in the memory and then migrating compressed data to a second part of memory units in the memory, wherein the memory comprises a plurality of memory units, occupied storage space in the first part of memory units is less than a threshold, and the second part of memory units comprises a memory unit that stores data of an operating system and a memory unit whose occupied storage space is greater than the threshold; and
controlling the device to enter a suspended state, in which components in the device other than the second part of memory units are powered off.

12. The method according to claim 11, wherein before the saving running information of the system to a memory of the device, the method further comprises:
terminating a background process that is unrelated to a foreground process and that runs in the system, and releasing memory space occupied by the background process.

13. The method according to claim 11, wherein before the controlling the device to enter a suspended state, the method further comprises:
releasing memory space occupied by an inactive page in the memory.

14. The method according to claim 11, further comprising:
restoring power supply to the components in the device other than the second part of memory units;
decompressing the compressed data stored in the second part of memory units and then migrating decompressed data to the first part of memory units; and
restoring, based on data stored in the first part of memory units and the second part of memory units, a process that runs in the system before the device enters the suspended state.

15. A computing device, comprising:
a memory, configured to store program instructions; and
a processor, coupled to the memory and configured to execute the program instructions to perform a device suspension method comprising:
when a system of a device is in an idle state, terminating a background process that is unrelated to a foreground process and that runs in the system, and releasing memory space occupied by the background process;
storing running information of the system in a memory of the device, wherein the running information of the system does not comprise information about the background process; and
controlling the device to enter a suspended state,
wherein the memory of the device comprises a plurality of memory units, the controlling the device to enter a suspended state comprises powering off components in the device other than at least a part of the memory units in the memory of the device,
wherein before the controlling the device to enter a suspended state, the device suspension method further comprises:
compressing data in a first part of memory units in the memory and then migrating compressed data to a second part of memory units in the memory, wherein occupied storage space in the first part of memory units is less than a threshold, and the second part of memory units comprises a memory unit that stores data of an operating system and a memory unit whose occupied storage space is greater than or equal to the threshold; and
the controlling the device to enter a suspended state comprises:
powering off components in the device other than the second part of memory units.

16. The computing device according to claim 15, wherein before the controlling the device to enter a suspended state, the device suspension method further comprises:
releasing memory space occupied by an inactive page in the memory.

17. The computing device according to claim 15, the device suspension method further comprises:
restoring power supply to the components in the device other than the second part of memory units;
decompressing the compressed data stored in the second part of memory units and then migrating decompressed data to the first part of memory units; and
restoring, based on data stored in the first part of memory units and the second part of memory units, a process that runs in the system before the device enters the suspended state.

\* \* \* \* \*